March 25, 1952    C. W. MERRIAM, JR., ET AL    2,590,115
BEARING CIRCLE
Filed Oct. 26, 1945

INVENTORS
CHARLES W. MERRIAM, JR.
WILLIAM L. MOREY
BY
Ralph L. Chappell
ATTORNEY Patented Mar. 25, 1952

2,590,115

UNITED STATES PATENT OFFICE 2,590,115

BEARING CIRCLE

Charles W. Merriam, Jr., Taunton, and
William L. Morey, Melrose, Mass.

Application October 26, 1945, Serial No. 624,921

6 Claims. (Cl. 33—72)

(Granted under the act of March 3, 1883, as
amended April 30, 1928; 370 O. G. 757)

This invention relates to bearing circles of the type used with a magnetic compass or with a gyro compass repeater of the pelorus type and is directed more particularly to a bearing circle having provision for applying compass error to bearings taken in azimuth.

In certain instances it may be desired to report as a magnetic bearing, the bearing of an object obtained as a true bearing by its observation through the usual sight of a bearing circle. In other cases it is necessary to observe a bearing as a magnetic bearing and convert it to a true bearing. In either situation, the conversion of a bearing from one kind to the other involves the application of compass error either by subtraction or addition depending upon the direction of the error and the direction of the conversion. This conversion, although relatively simple, tends to be confusing, and gives rise to the possibility of accumulated error if any error is made.

In view of the foregoing, it is an object of the invention to provide an improved bearing circle by the use of which the conversion of bearings as a separate computation is eliminated.

To this end, the illustrated bearing circle includes, as a feature of the invention, a pair of pointers one of which is fixed in alignment with the sight, the other being adjustable in azimuth to either side of the fixed one in accordance with the kind and amount of compass error which must be corrected. Hence, by reading the card of a true-north-seeking compass opposite to the adjustable pointer, the magnetic bearing corresponding to the true bearing indicated by the fixed index is obtained by inspection. Conversely, by reading the card of a magnetic-north-seeking compass opposite to the adjustable pointer, a true bearing corresponding to the magnetic bearing observed is obtained by inspection.

The illustrated bearing circle also comprises an improved sight, the construction of which is particularly adapted for the observation of aerial objects as well as surface objects.

With the above and other objects and features in view, the invention will now be described with reference to the accompanying drawings which illustrate a preferred embodiment of the invention and will be pointed out in the claims.

Figure 1:
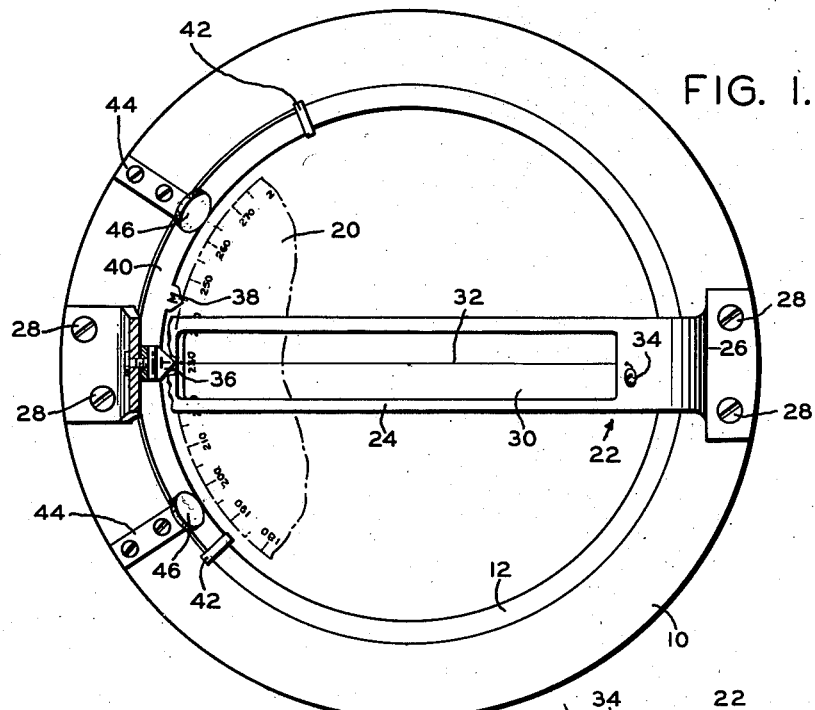
Figure 2:
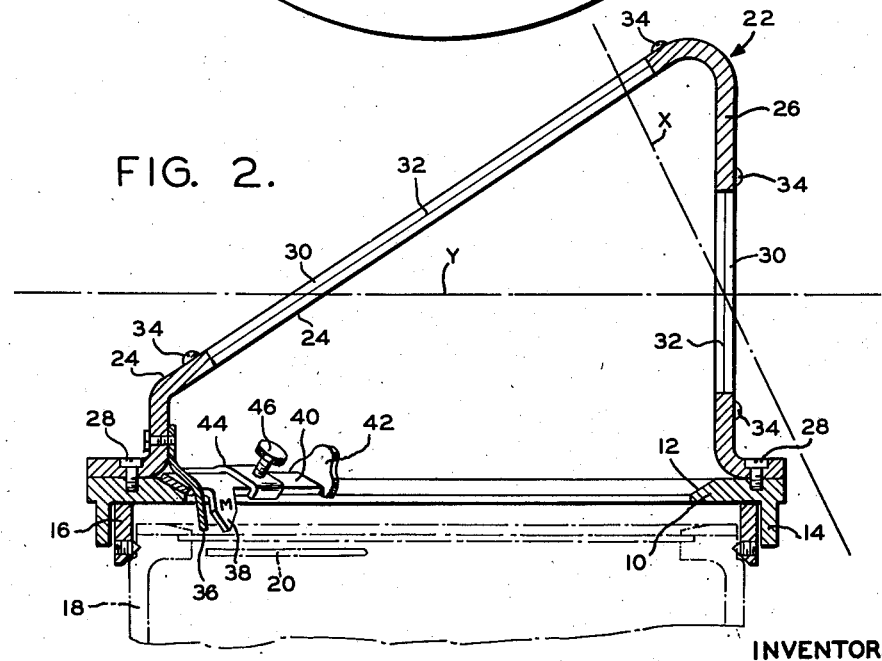

Fig. 1 is a plan view of an illustrative bearing circle embodying the invention, a part of the sight being broken away, and Fig. 2 is a sectional elevation of the bearing circle shown in Fig. 1 (the section being taken through the center of the sight) as installed on a compass or pelorus.

The illustrated bearing circle comprises a ring 10 having an inner beveled rim 12 and a downwardly extending flange 14. The size of the ring is such as to permit it to be installed on the casings of most compasses or peloruses. However, as illustrated in Fig. 2, the ring 10 is rotatably mounted on an adaptor sleeve 16 which is attached by means of set screws to the casing 18 of a compass having a card 20, only a part of which is shown. The bearing circle further comprises a sight 22 consisting of an inclined vane 24 and a substantially erect vane 26, the lower ends of which are fixed to the ring 10 by screws 28. The vanes 24 and 26 are provided with elongated slots 30, through the center of each of which extends a wire 32. The wires are secured on a tension by screws 34 in the usual manner. Since the ends of the vane 24 and the wire 32 associated therewith extend from one side of the card 20 to the other, it is possible to direct the line of sight through the vanes 24 and 26 at an elevation approaching 90° as along the line X. The sight is thus adapted for observing objects at relatively high elevation. The sight is equally well adapted for making horizontal observations as along the line Y.

A pointer 36 is fixed to the base of the vane 24, is spaced slightly from the rim 12, and is arranged to lie in indicating relationship with the edge of the card 20. This pointer is thus fixed in alignment with the sight 22 and indicates the bearing observed through the sight according to that graduation on the card 20 which is opposite to the pointer. This bearing may be either true or magnetic, depending upon the type of instrument with which the bearing circle is used. A second pointer 38 is fixed to a slide 40. The slide 40 is of a width corresponding to the width of the beveled rim 12, and is mounted for sliding movement thereon by a pair of spaced brackets 44 secured to the ring 10. Clamping screws 46 are threaded in the brackets 44 for securing the slide 40 and its pointer 38 in adjusted position.

By the foregoing construction, it is obvious that the amount of offset between the true north of the compass and its magnetic north (which varies with the location on the earth's surface and the ship's heading) may be fixed for observation by inspection, by merely shifting the slide 40 and pointer 38 relative to the pointer 36 an amount corresponding to this offset, and taking up upon the clamping screws 46. Conversely, this relative offset adjustment may be made as between a fixed, magnetic north and an adjustable, true north.

The invention described herein may be manufactured and used by or for the Government of the United States of America for government purposes without the payment of any royalty thereon or therefor.

Having described the invention what is claimed as novel and desired to be protected by Letters Patent of the United States is:

1. A bearing circle comprising a ring adapted to be mounted for rotation with respect to a bearing indicating card, a sight having an inclined vane extending from said ring at one side to a point directly above said ring at the opposite side thereof and a substantially erect vane integral with said inclined vane, said erect vane being fixed to said ring at the said opposite side thereof, and a pointer mounted on said ring for adjustment in azimuth at each side of a position of alignment with said sight.

2. A bearing circle comprising a fixed ring adapted to be clamped to the housing of a bearing indicating card, a movable ring mounted for rotation with respect to said fixed ring, a sight mounted on said movable ring, a first pointer attached to said sight in alignment with the reference direction thereof, said first pointer being arranged to overlie the edge of said bearing indicating card, and a slide mounted for adjustment along said movable ring, said slide having a second pointer also arranged to overlie the edge of said card.

3. A bearing circle comprising a fixed ring adapted to be clamped to the housing of a bearing indicating card, said fixed ring being arranged to lie wholly without the circumference of said bearing indicating card, a movable ring mounted for rotation on said fixed ring, said movable ring also being arranged to lie wholly without the circumference of said bearing indicating card, a sight having a shorter and a longer, substantially erect vane secured to said movable ring and an inclined vane formed integrally with the ends of said upright vanes remote from said movable ring, a pointer arranged for rotation with said movable ring, said pointer being further arranged in a fixed position with respect to said sight and in an overlapping relationship with respect to the edge of said card, a slide mounted for adjustment along said movable ring, said slide having a second pointer arranged to overlie the edge of said card and a clamp for holding said second pointer in an adjusted position.

4. A bearing circle comprising a fixed ring adapted to be clamped to the housing of a bearing indicating card, said fixed ring being arranged to lie wholly without the circumference of said bearing indicating card, a movable ring mounted for rotation on said fixed ring, said movable ring also being arranged to lie wholly without the circumference of said bearing indicating card, a sight having a shorter and a longer, substantially erect vane secured to said movable ring and an inclined vane secured to the ends of said upright vanes remote from said movable ring, a pointer arranged for rotation with said movable ring, said pointer being further arranged in a fixed position with respect to said sight and in an overlying relationship with respect to the edge of said card, a slide mounted for adjustment along the movable ring, said slide having a second pointer arranged to overlie the edge of said card.

5. A bearing circle comprising a fixed ring adapted to be clamped to the housing of a bearing indicating card, said fixed ring being arranged to lie wholly without the circumference of said bearing indicating card, a movable ring mounted for rotation on said fixed ring, said movable ring also being arranged to lie wholly without the circumference of said bearing indicating card, a sight mounted on said movable ring, said sight comprising a vertical member and an inclined member each having the lower end thereof secured to said movable ring at diametrically opposed points, the upper end of said vertical member being secured to the upper end of said inclined member, a pointer arranged for rotation with said movable ring, said pointer being further arranged in a fixed position with respect to said sight and in overlying relationship with the edge of said card, and a slide mounted for adjustment along said movable ring, said slide including a second pointer arranged to overlie the edge of said card.

6. A bearing circle comprising a fixed ring adapted to be clamped to the housing of a bearing indicating card, said fixed ring being arranged to lie wholly without the circumference of said bearing indicating card, a movable ring mounted for rotation on said fixed ring, said movable ring also being arranged to lie wholly without the circumference of said bearing indicating card, a sight mounted on said movable ring, a first pointer attached to said movable ring in alignment with the reference direction of said sight, said first pointer being arranged to overlie the edge of said bearing indicating card, and a slide mounted for adjustment along said movable ring, said slide carrying a second pointer also arranged to overlie the edge of said card.

CHARLES W. MERRIAM, Jr.
WILLIAM L. MOREY.

REFERENCES CITED

The following references are of record in the file of this patent:

UNITED STATES PATENTS

| Number | Name | Date |
|---|---|---|
| 961,862 | Huntington | June 21, 1910 |
| 1,474,394 | Warburg | Nov. 20, 1923 |
| 2,059,944 | Green | Nov. 3, 1936 |

FOREIGN PATENTS

| Number | Country | Date |
|---|---|---|
| 665 | Great Britain | Mar. 18, 1853 |
| 933 | Great Britain | Feb. 25, 1882 |
| 22,568 | Great Britain | Oct. 4, 1912 |
| 451,080 | France | Feb. 5, 1913 |